US012080220B1

(12) United States Patent
Xiong et al.

(10) Patent No.: US 12,080,220 B1
(45) Date of Patent: Sep. 3, 2024

(54) DRIVING CIRCUIT, DRIVING METHOD, AND DISPLAY DEVICE

(71) Applicant: HKC CORPORATION LIMITED, Shenzhen (CN)

(72) Inventors: Zhi Xiong, Chongqing (CN); Mingliang Wang, Chongqing (CN); Rongrong Li, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/218,534

(22) Filed: Jul. 5, 2023

(30) Foreign Application Priority Data

Mar. 17, 2023 (CN) ........................ 202310289847.5

(51) Int. Cl.
*G09G 3/20* (2006.01)

(52) U.S. Cl.
CPC ..... *G09G 3/2092* (2013.01); *G09G 2330/026* (2013.01); *G09G 2330/08* (2013.01); *G09G 2370/00* (2013.01)

(58) Field of Classification Search
CPC .......... G09G 3/2092; G09G 2330/026; G09G 2330/08; G09G 2370/00
See application file for complete search history.

(56) References Cited

U.S. PATENT DOCUMENTS

2001/0015712 A1* 8/2001 Hashimoto .......... G09G 3/3688 345/92
2007/0070005 A1* 3/2007 Okamura ............... G09G 5/363 345/88
2007/0132701 A1* 6/2007 Jeon ..................... G09G 3/3611 345/100
2007/0164883 A1* 7/2007 Furtner ............... H04L 25/4908 341/126
2008/0218232 A1* 9/2008 Jeon ......................... G09G 3/20 327/165
2008/0246755 A1* 10/2008 Lee .......................... G09G 3/20 345/214
2009/0115477 A1* 5/2009 Lin .......................... G09G 3/20 327/161
2009/0174691 A1* 7/2009 Yeo ........................ G09G 5/008 345/204
2010/0039426 A1* 2/2010 Matsumoto .... H03K 19/018528 345/98
2010/0045588 A1* 2/2010 Lee ...................... G09G 3/3688 345/99

(Continued)

*Primary Examiner* — Jose R Soto Lopez

(57) ABSTRACT

A driving circuit, a driving method and a display device are disclosed. The driving circuit includes a memory, a timing controller and a power chip. The memory is connected to each of the timing controller and the power chip. The power chip includes a first analyzing module and a working module. The working module includes a fault output terminal. The timing controller includes a second analyzing module and a reset terminal. During a power-on phase, the timing controller reads and analyzes the driving data located in the memory through the second analyzing module, and transmits the analyzed driving data to the first analyzing module of the power chip for use by the power chip. During a fault phase, the fault output terminal outputs a fault signal, and the reset terminal receives the fault signal to control the timing controller and the power chip to reset in tandem.

18 Claims, 3 Drawing Sheets

(56) References Cited

U.S. PATENT DOCUMENTS

2010/0085084 A1* 4/2010 Kim .................... G09G 3/3648 327/108
2010/0128064 A1* 5/2010 Taylor .................. G09G 3/3413 345/83
2010/0177085 A1* 7/2010 Yamagishi ............... G09G 3/36 345/87
2010/0231787 A1* 9/2010 Kim .................... G09G 3/3688 348/503
2010/0315552 A1* 12/2010 Rothaar .................. H03L 7/093 359/199.1
2011/0032421 A1* 2/2011 Kota ....................... G09G 5/18 348/E5.009
2011/0080382 A1* 4/2011 Koo ......................... G09G 3/20 327/108
2011/0157104 A1* 6/2011 Kang .................. G09G 3/3611 345/204
2011/0286562 A1* 11/2011 Jeon ...................... H03L 7/0816 375/371
2011/0292028 A1* 12/2011 Seo ..................... G09G 3/2096 345/213
2016/0241251 A1* 8/2016 Kim ...................... H03L 7/0995
2016/0260411 A1* 9/2016 Han ....................... G09G 5/008
2016/0284313 A1* 9/2016 Lin .......................... G09G 5/18
2017/0206848 A1* 7/2017 Jeon ..................... G09G 3/2007
2017/0309242 A1* 10/2017 Kim .................. H01L 29/78633
2018/0040267 A1* 2/2018 Huang .................. G09G 3/006
2018/0096656 A1* 4/2018 Lee ...................... G09G 3/3266
2018/0190238 A1* 7/2018 Park ....................... G09G 5/008
2018/0357946 A1* 12/2018 Ryu ..................... G09G 3/2092
2019/0155432 A1* 5/2019 Park ...................... G06F 3/0412
2019/0156761 A1* 5/2019 Kim ..................... G09G 3/3677
2020/0029059 A1* 1/2020 Chahine ................. H04N 23/23
2021/0020134 A1* 1/2021 Park ..................... G09G 3/3677
2021/0125572 A1* 4/2021 Zhang .................. G09G 3/3696
2022/0139325 A1* 5/2022 Lee ......................... G06F 3/147 345/694
2022/0208145 A1* 6/2022 Glen ..................... G06F 3/1446
2023/0018128 A1* 1/2023 Byeon ...................... G09G 5/18
2023/0040625 A1* 2/2023 Park ..................... G09G 3/3291

* cited by examiner

DRIVING CIRCUIT, DRIVING METHOD, AND DISPLAY DEVICE

CROSS-REFERENCE TO RELATED APPLICATIONS

This application claims the priority and benefit of Chinese patent application number 2023102898475, titled "Driving Circuit, Driving Method, and Display Device" and filed Mar. 17, 2023, with China National Intellectual Property Administration, the entire contents of which are incorporated herein by reference.

TECHNICAL FIELD

The present application relates to the field of display technology, and in particular to a driving circuit, a driving method and a display device.

BACKGROUND

The description provided in this section is intended for the mere purpose of providing background information related to the present application but doesn't necessarily constitute prior art.

In order to solve the problem that the power chip (Power IC) requires many pins when setting by means of analog resistors, hence complicated layout of the printed circuit board (PCB), more and more power chips use the digital method of the integrated circuit bus (Inter-Integrated Circuit, or i2c) to design the chip. However, the power chip designed using this solution may need to set a non-volatile memory (NVM) to store the set configuration information of the power chip, so as to ensure that the configuration information can be saved after power-off, thus avoiding the failure to store the set configuration information of the power chip when the power is off.

However, since an additional non-volatile memory needs to be set in the power chip, the structure of the printed circuit board in the display device is rendered complicated. Furthermore, the test steps are also increased during the packaging test, which increases labor costs and material costs, causing inconvenience.

SUMMARY

In view of the above, it is therefore one purpose of the present application to provide a driving circuit, a driving method and a display device, without the need of setting a non-volatile memory in the power chip, thereby reducing labor costs and material costs.

The application discloses a driving circuit. The driving circuit includes a memory, a timing controller and a power chip. The memory is connected to each of the timing controller and the power chip. The power chip includes a first analyzing module and a working module. An input terminal of the first analyzing module is connected to the timing controller. An output terminal of the first analyzing module is connected to the working module. The working module includes a fault output terminal. The timing controller includes a second analyzing module and a reset terminal. An input terminal of the second analyzing module is connected to an output terminal of the memory. The reset terminal is connected to the fault output terminal. During a power-on phase, the timing controller reads and analyzes the driving data in the memory through the second analyzing module, and the timing controller transmits the analyzed driving data to the first analyzing module of the power chip for use by the power chip. In a fault phase, the fault output terminal outputs a fault signal, and the reset terminal receives the fault signal to control the timing controller and the power chip to reset in tandem.

In some embodiments, the working module includes a register, a logic module, a delay control module and a transistor. An input terminal of the register is connected to an output terminal of the first analyzing module. An output terminal of the register is connected to an input terminal of the logic module. An output terminal of the logic module is connected to an input terminal of the delay control module. An output terminal of the delay control module is connected to a gate of the transistor. The power chip further includes a first ground terminal connected to a drain of the transistor. The fault output terminal is connected to a source of the transistor. In the fault phase, the logic module outputs a high-level signal, which is delayed by the delay control module and then output to the gate of the transistor to control the transistor to be turned on, so that the fault output terminal outputs a corresponding fault signal.

In some embodiments, the delay control module includes an inverter, a delay controller and a logic OR gate. Both the input terminal of the inverter and the input terminal of the delay controller are connected to the output terminal of the logic module. Both the output terminal of the inverter and the output terminal of the delay controller are connected to the input terminal of the logical OR gate. The output terminal of the logic OR gate is connected to the gate of the transistor. In the normal display phase, the logic module outputs a low-level signal, and the inverter and delay controller receive the low-level signal output by the logic module and output a low-level signal. At this time, the logic OR gate outputs a low level signal. In the fault phase, the logic module outputs a high level signal, the inverter and the delay controller receive the high level signal output by the logic module, the inverter outputs a high level signal to the logic OR gate, and the delay controller outputs a low level signal to logic OR gate. At this time, the output of the logic OR gate is a low level signal. After a delay of N seconds, the delay controller outputs a high-level signal to the logic OR gate, and the logic OR gate outputs a high-level signal to turn on the transistor. Said N is greater than 0.

In some embodiments, the timing controller includes a reset control module, and the input terminal of the reset control module is connected to the reset terminal. The reset terminal receives the fault signal and sends it to the reset control module, and the reset control module controls the timing controller to reset.

In some embodiments, the driving circuit further includes a power supply interface, a pull-up resistor, a storage capacitor and a second ground terminal. The power supply interface is connected to the input terminal of the pull-up resistor. The output terminal of the pull-up resistor is connected to the reset terminal, to the fault output terminal and to the input terminal of the storage capacitor. The output terminal of the storage capacitor is connected to the second ground terminal.

In some embodiments, the connection between the memory and each of the timing controller and the power chip is an integrated circuit bus connection.

In some embodiments, the memory is a charged erasable programmable read-only memory.

In some embodiments, the driving circuit includes a printed circuit board, where the memory, the timing controller and the power chip are all arranged on the printed circuit board.

The present application further discloses a driving method, which is applied to the above-mentioned driving circuit, comprising steps:

reading and analyzing, by the timing controller, the driving data located in the memory;

reading and analyzing, by the timing controller, the driving data located in the memory;

transmitting the analyzed driving data corresponding to the power chip to the first analyzing module of the power chip; and The present application further discloses a display device, which includes a display panel and the driving circuit as described above, where the driving circuit is used to drive the display panel.

Compared with the solution of setting non-volatile memory in the power chip, this application sets the first analyzing module, the second analyzing module and the memory, where the second analyzing module reads and analyzes the driving data stored in the memory, and transmits the analyzed driving data partially to the first analyzing module for use by the power chip, so that there is no need to set non-volatile memory in the power chip, which reduces labor costs and material costs. Furthermore, the fault output terminal of the power chip is connected to the reset terminal of the timing controller. When the power chip fails, the fault output terminal of the power chip will output a fault signal to the reset terminal, and the reset terminal receives the fault signal to control the timing controller and the power chip to reset in tandem, so that the timing controller does not need to set the readback function, reducing the design complexity of the timing controller.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
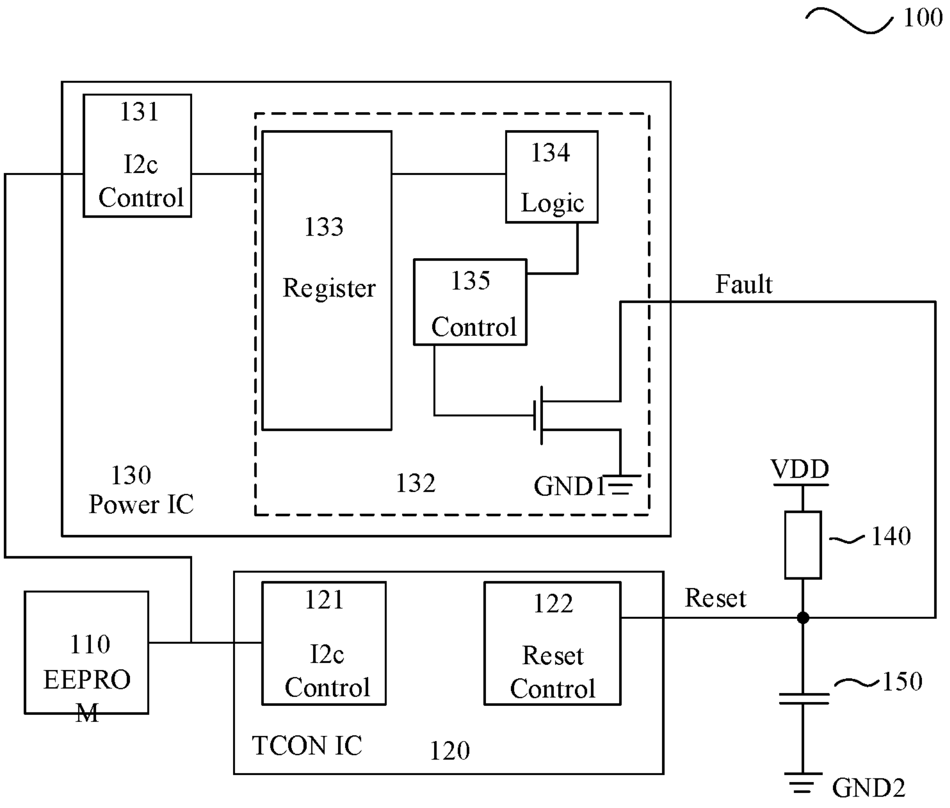
FIG. 1 is a schematic diagram of an overall structure of a driving circuit according to a first embodiment of the present application.

In the drawings: 100, driving circuit; 110, memory; 120, timing controller; 121, second analyzing module; 122, reset control module; 130, power chip; 131, first analyzing module; 132, working module; 133, register; 134, logic module; 135, delay control module; 137, inverter; 138, delay controller; 139, logic OR gate; 140, pull-up resistor; 150, storage capacitor; 160, printed circuit board; 200, display panel; 300, display device.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

The present application will be described in detail below with reference to the accompanying drawings and optional embodiments. It should be noted that, should no conflict is present, the various embodiments or technical features described below can be combined arbitrarily to form new embodiments.

As shown in FIG. 1, as a first embodiment of the present application, a driving circuit 100 is disclosed. The driving circuit 100 includes a memory 110, a timing controller 120 (TCON IC, or Timing Control IC), and a power chip 130 (Power IC). The memory 110 is connected to each of the timing controller 120 and the power chip 130. The power chip 130 includes a first analyzing module 131 and a working module 132. An input terminal of the first analyzing module 131 is connected to the timing controller 120. An output terminal of the first analyzing module 131 is connected to the working module 132. The working module 132 includes a fault output terminal Fault. The timing controller 120 includes a second analyzing module 121 and a reset terminal Reset. The input terminal of the second analyzing module 121 is connected to the output terminal of the memory 110, and the reset terminal Reset is connected to the fault output terminal Fault.

During the power-on phase, the timing controller 120 reads and analyzes the driving data located in the memory 110 through the second analyzing module 121, and the timing controller 120 transmits the analyzed driving data to the first analyzing module 131 of the power chip 130 for use by the power chip 130, so that there is no need to set a non-volatile memory 110 in the power chip 130. Compared with the solution of setting the non-volatile memory 110 in the power chip 130, the cost and manufacturing process of the non-volatile memory 110 are saved, thereby reducing the material cost and labor cost of the power chip 130. In the fault phase, the fault output terminal Fault outputs a fault signal, and the reset terminal Reset receives the fault signal to control the timing controller 120 and the power chip 130 to reset in tandem. During this process, the power chip 130 will actively output a fault signal through the fault output terminal Fault. Since the reset terminal Reset of the timing controller 120 is connected to the fault output terminal Fault, the reset terminal Reset of the timing controller 120 will receive the fault signal output by the fault output terminal Fault, so that the timing controller 120 knows that the power chip 130 is in the fault phase at this time. The timing controller 120 can know whether the power chip 130 is in a failure phase without setting the readback function, and the timing controller 120 can also reset in tandem with the power chip 130, reducing the complexity of setting the timing controller 120. That is, the timing controller 120 of the original design can be used without making improvements to the timing controller 120, reducing the setup cost of the driving circuit 100. When the timing controller 120 and the power chip 130 are reset, the timing controller 120 reads and analyzes the driving data located in the memory 110 through the second analyzing module 121, and transmits the analyzed driving data to the first analyzing module 131 of the power chip 130 for use by the power chip 130, to complete the reset and display images normally. It should be noted that the memory 110 stores the first driving data for driving the timing controller 120 and the second driving data for driving the power chip 130, making full use of the space in the memory 110. The first driving data and the second driving data need to be analyzed by the timing controller 120 before they can be used.

In this embodiment, the connection between the memory 110 and each of the timing controller 120 and the power chip 130 is an integrated circuit bus (i2c) connection. Using the i2c communication protocol only needs one data line and one clock line to accomplish half-duplex communication. After the power chip 130 adopts i2c, related settings can be modified through i2c. Both the first analyzing module 131 and the second analyzing module 121 are i2c control modules used for receiving data transmitted via the integrated circuit bus i2c. Furthermore, the timing controller 120 serves as a communication master, and the power chip 130 serves as a communication slave. Since the timing controller 120 has better function expandability than the power chip 130, using it as the communication master device can also effectively reduce the cost of the power chip 130 and make full use of the processing capability of the timing controller 120. The memory 110 is an electrically erasable programmable read-only memory 110 (EEPROM). EEPROM is a user-changeable read-only memory 110, which can erase existing information and reprogram to write new data on special equipment such as computers. It has good stability and security, and has a flexible and wide application range, hence an ideal memory 110 for display driving devices.

Further, the working module 132 includes a register 133 (Register), a logic module 134 (Logic), a delay control module 135 and a transistor. An input terminal of the register 133 is connected to an output terminal of the first analyzing module 131. An output terminal of the register 133 is connected to an input terminal of the logic module 134. An output terminal of the logic module 134 is connected to the input terminal of the delay control module 135. An output terminal of the delay control module 135 is connected to a gate of the transistor. The power chip 130 further includes a first ground terminal GND1, the first ground terminal GND1 being connected to a drain of the transistor. The fault output terminal Fault is connected to a source of the transistor.

In the failure phase, the logic module 134 determines that the power chip 130 is faulty, and accordingly outputs a high-level signal, which is output to the gate of the transistor after being delayed by the delay control module 135 thus controlling the transistor to be turned on, so that the fault output terminal Fault outputs a corresponding fault signal. The reset terminal Reset receives the fault signal so that the timing controller 120 knows that the power chip 130 is faulty at this time, and then the timing controller 120 and the power chip 130 are controlled to reset in tandem to restore the driving data when images are displayed normally. While in the normal display phase, the logic module 134 determines that the power chip 130 is in a normal working state, and accordingly outputs a low level signal, which is output to the gate of the transistor through the delay control module 135. At this time, the transistor is not turned on, the fault output terminal Fault will not output a fault signal, and the reset terminal Reset will not receive a fault signal, so that the timing controller 120 continues to work normally. The setting of the delay control module 135 is intended for the purpose of reserving enough time to allow the voltages of the timing controller 120 and the power chip 130 to drop from high level to low level, and then recover from low level to high level to complete one reset. It should be noted that in the setting of the delay control module 135, the delay value may be set when the power chip 130 is manufactured, or it is also possible to modify the delay value through other external settings, where the specifics will not be described in detail, and designers can select and design according to actual needs.

Figure 2:
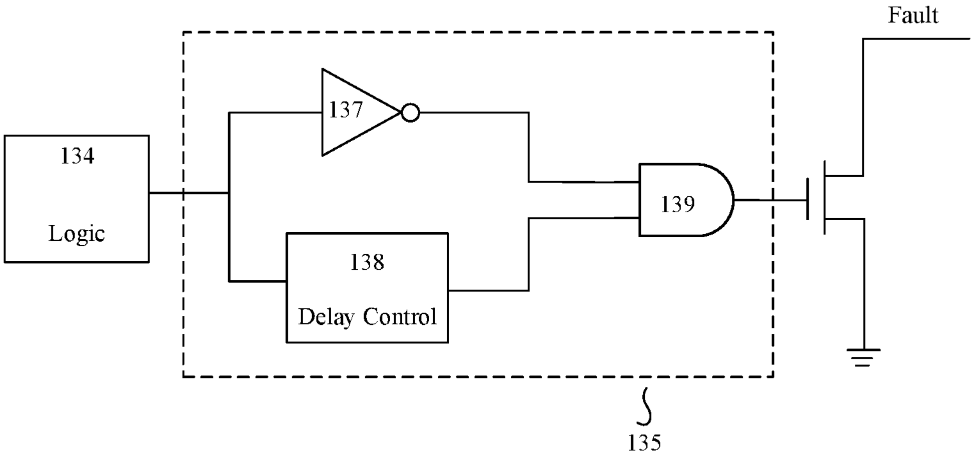
FIG. 2 is a schematic diagram of a delay control module in the first embodiment of the present application.

Specifically, as shown in FIG. 2, the delay control module 135 includes an inverter 137, a delay controller 138 (Delay Control) and a logic OR gate 139. Both the input terminal of the inverter 137 and the input terminal of the delay controller 138 are connected to the output terminal of the logic module 134. The output terminal of the inverter 137 and the output terminal of the delay controller 138 are each connected to the input terminal of the logical OR gate 139. The output terminal of the logic OR gate 139 is connected to the gate of the transistor.

Figure 3:
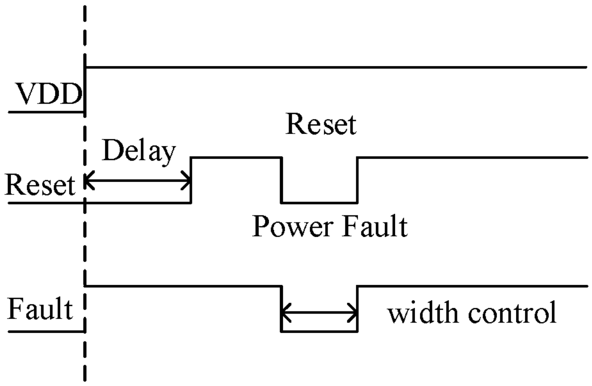
FIG. 3 is a timing diagram at a reset terminal, a fault output terminal and a power supply interface in the first embodiment of the present application.

During the normal display phase, the logic module 134 determines that the power chip 130 is in a normal working state, and so the logic module 134 outputs a low level signal. At this time, the inverter 137 and the delay controller 138 receive the low-level signal output by the logic module 134 and output a low-level signal to the logical OR gate 139. The logic OR gate 139 then outputs a low level signal to the gate of the transistor after receiving the low level signal. At this time, the transistor will not be turned on, the fault output terminal Fault and the reset terminal Reset are both high-level signals, and the timing controller 120 and the power chip 130 will not reset. During the failure phase, the logic module 134 judges that the power chip 130 is in a failure state, and so the logic module 134 outputs a high level signal. The inverter 137 and the delay controller 138 receive the high-level signal output by logic module 134, and so the inverter 137 outputs a high-level signal to logic OR gate 139. At this time, the delay controller 138 will still output a low level signal to the logic OR gate 139 under its own setting, so that the logic OR gate 139 outputs a low level signal. The transistor is temporarily not turned on, and after the delay N seconds preset by the delay controller 138, the delay controller 138 at this time will output a high level signal to the logic OR gate 139. The logic OR gate 139 receives the high-level signal from the delay controller 138 and from the inverter 137 at the same time, and so outputs a high-level signal to the gate of the transistor to turn on the transistor. At this time, the fault output terminal Fault of the power chip 130 and the reset terminal Reset of the timing controller 120 are low-level signals, and when the timing controller 120 detects that the reset terminal Reset is a low-level signal, it determines that the power chip 130 is in a fault phase at this time, so that the timing controller 120 and the power chip 130 are reset to restore the normal display of images. By setting the delay controller 138, when an abnormal fault occurs in the power chip 130, the power chip 130 will not reset immediately, but will notify the timing controller 120 after a delay of a period of time by the delay controller 138, so as to reserve a time slot for the voltages of the timing controller 120 and the power chip 130 to drop from a high level to a low level. Then the timing controller 120 and the power chip 130 perform the reset operation together, and the voltages of the timing controller 120 and the power chip 130 recover from a low level to a high level to complete the reset. A timing diagram of the reset terminal Reset and the fault output terminal Fault is shown in FIG. 3. In this embodiment, the N is greater than 0. It should be noted that the delay time of the delay controller 138 is set to N seconds. The setting of N may be done when the power chip 130 is manufactured, or may be modified through other external settings, which will not be described in detail here.

Further, the timing controller 120 includes a reset control module 122 (Reset Control), and the input terminal of the reset control module 122 is connected to the reset terminal Reset. When an abnormal fault occurs in the power chip 130, the fault output terminal of the power chip 130 will output a fault signal, that is, output a low level signal as described above. The reset terminal receives the fault signal and sends it to the reset control module 122. After the reset control module 122 detects a fault signal, it controls the timing controller 120 to reset. When the power chip 130 is working normally, the fault output terminal of the power chip 130 outputs a high level signal, and the reset terminal is also a high level signal. When the reset control terminal detects that the reset terminal is a high-level signal, no reset is performed.

As shown in FIG. 1, the driving circuit 100 further includes a power supply interface VDD, a pull-up resistor 140, a storage capacitor 150 and a second ground terminal GND2. The power supply interface is connected to an input terminal of the pull-up resistor 140. An output terminal of the pull-up resistor 140 is connected to the reset terminal Reset, to the fault output terminal Fault and to an input terminal of the storage capacitor 150. An output terminal of the storage capacitor 150 is connected to the second ground terminal GND2. In this embodiment, since the fault output terminal Fault is connected to the reset terminal Reset, and the output terminal of the pull-up resistor 140 is connected to both the reset terminal Reset and the fault output terminal Fault, there is no need to separately set the pull-up resistor 140 for the reset terminal Reset and the fault output terminal Fault, which saves a pull-up resistor 140 device, thereby reducing the material cost of the driving circuit 100.

Figure 4:
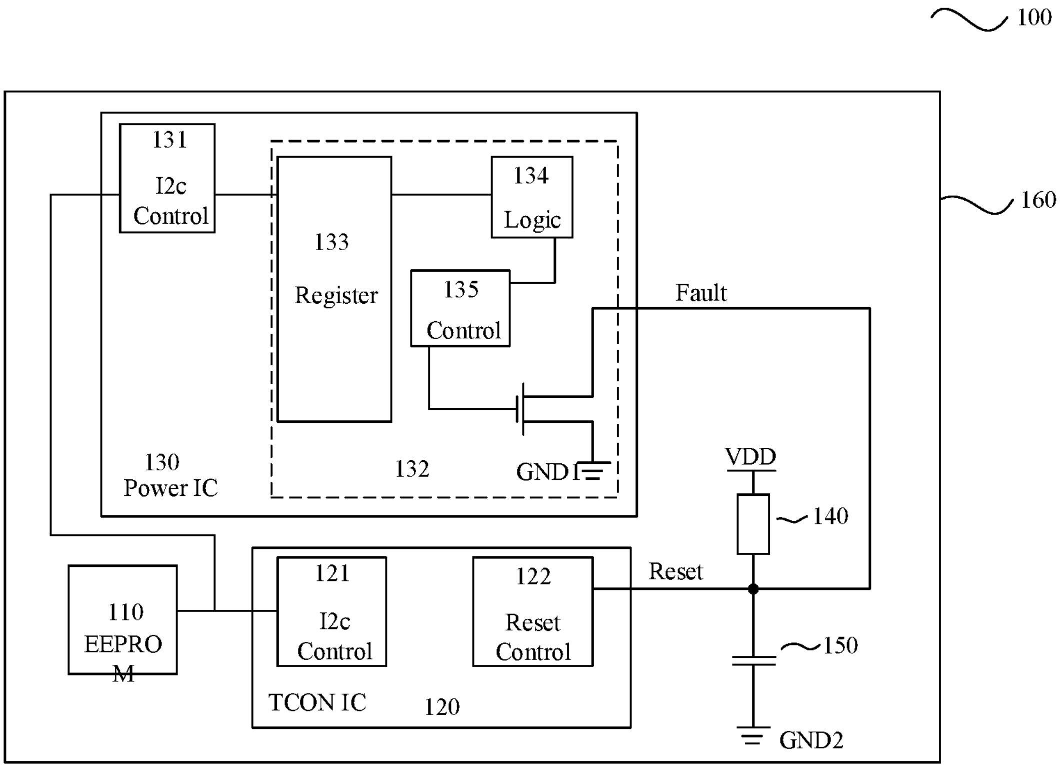
FIG. 4 is a schematic diagram of a driving circuit according to a second embodiment of the present application.

As shown in FIG. 4, as the second embodiment of the present application, which is an improvement of the first embodiment, a driving circuit 100 is disclosed. The driving circuit 100 includes a printed circuit board 160. The memory 110, the timing controller 120 and the power chip 130 are all arranged on the printed circuit board 160. Adopting the layout of the printed circuit board 160 composed of the memory 110, timing controller 120 and power chip 130 in this embodiment, the layout of the printed circuit board 160 is not only simple, but also can make full use of the space in the memory 110, saving the non-volatile memory 110 of the power chip 130 on the printed circuit board 160, and reducing the space occupied by the power chip 130. Furthermore, the failure output terminal of the power chip 130 is connected to the reset terminal of the timing controller 120, so that only one pull-up resistor 140 needs to be set between the failure output terminal of the power chip 130 and the reset terminal of the timing controller 120, which saves a pull-up resistor 140 device and reduces the material cost. All in all, the design of the driving circuit 100 in this embodiment complements each other, and it not only can reduce the material cost and labor cost of the power chip 130, but also the power chip 130 and the timing controller 120 can operate and reset concurrently. The timing controller 120 also does not need to have a readback function, which reduces the complexity of the timing controller 120, so that designers can use the original timing controller 120 without improving the design of the timing controller 120.

Figure 5:
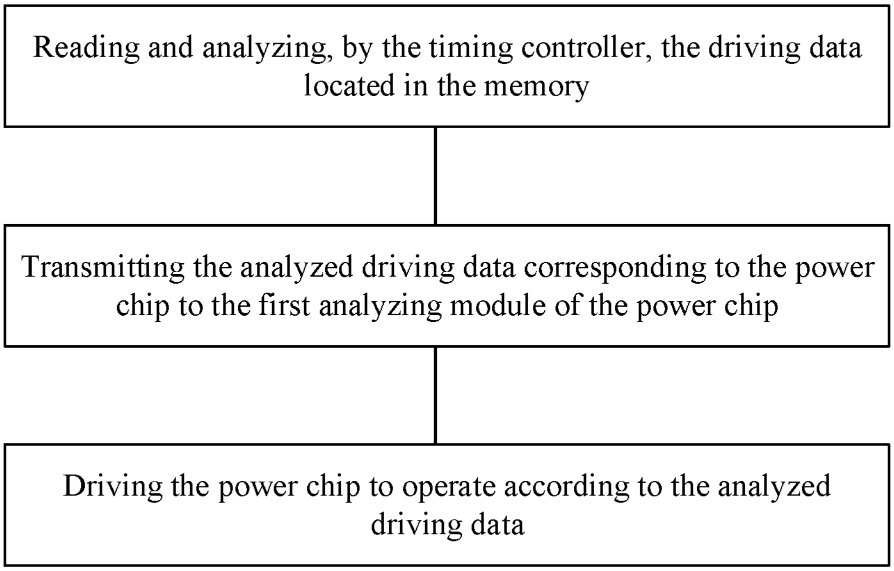
FIG. 5 is a flow chart of a driving method according to the third embodiment of the present application.

As shown in FIG. 5, as a third embodiment of the present application, a driving method is disclosed, which is applied to the above-mentioned driving circuit, and the driving method includes steps:

reading and parsing, by the timing controller, the driving data located in the memory;

transmitting the analyzed driving data of the corresponding power chip to the first analyzing module of the power chip;

driving the power chip to operate according to the analyzed driving data;

in the power-on phase, reading and analyzing, by the timing controller, the driving data located in the memory through the second analyzing module, and transmitting the analyzed driving data to the first analyzing module of the power chip for use by the power chip, so that there is no need to set a non-volatile memory in the power chip, making full use of the space in the memory, saving the cost and manufacturing process of the non-volatile memory, and reducing the material cost and labor cost of the power chip;

the driving method further includes the steps of:

outputting, by power chip, a fault signal;

receiving, by the timing controller, the fault signal;

resetting, by the timing controller and the power chip, together;

reading and analyzing, by the timing controller, the driving data located in the memory;

transmitting the analyzed driving data of the corresponding power chip to the first analyzing module of the power chip;

driving the power chip to operate according to the analyzed driving data;

during the fault phase, outputting, by the fault output terminal of the power chip, a fault signal, where the fault output terminal is connected to, the reset terminal of the timing controller, after the reset terminal of the timing controller receives the fault signal, the timing controller resets together with the power chip, so that the reset terminal of the timing controller operates in tandem with the fault output terminal of the power chip, and when the reset is performed, the timing controller reads and analyzes the driving data located in the memory through the second analyzing module, and transmits the analyzed driving data to the first analyzing module of the power chip for use by the power chip, thereby completing the reset, and the power chip works normally.

Figure 6:
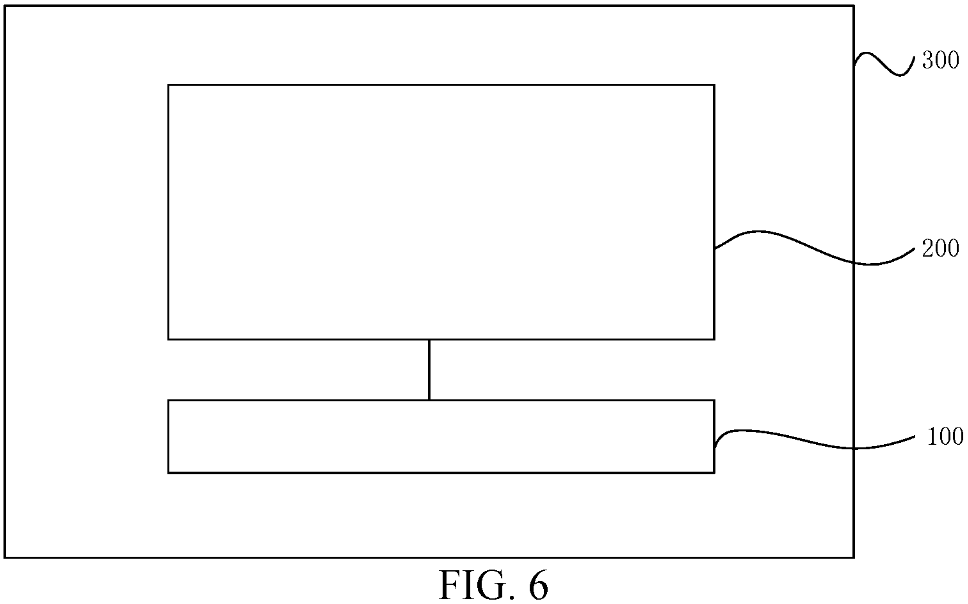
FIG. 6 is a schematic diagram of a display device according to a fourth embodiment of the present application.

As shown in FIG. 6, as a fourth embodiment of the present application, a display device 300 is disclosed. The display device 300 includes a display panel 200 and the above-mentioned driving circuit 100. The driving circuit 100 is used to drive the display panel 200. In the display device 300 in this embodiment, by setting the first analyzing module 131, the second analyzing module 121 and the memory 110, the second analyzing module 121 reads and analyzes the driving data stored in the memory 110, and transmits the analyzed driving data partially to the first analyzing module 131 for use by the power chip 130, so that there is no need to set non-volatile memory in the power chip 130, which reduces labor costs and material costs and makes full use of the space in the memory 110. Furthermore, the fault output terminal of the power chip 130 is connected to the reset terminal of the timing controller 120. When the power chip 130 fails, there is no need for the timing controller 120 to read back the state of the power chip 130, and the fault output terminal will output a fault signal to the reset terminal to inform the timing controller 120, so that the timing controller 120 and the power chip 130 can be reset in tandem, reducing the design complexity of the timing controller 120.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, other types of display panels, such as OLED (Organic Light-Emitting Diode) display panels, may also be applicable to the above solutions.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, and shall all be regarded as falling in the scope of protection of this application.

What is claimed is:

1. A driving circuit, comprising a memory, a timing controller, and a power chip; wherein the memory is connected to each of the timing controller and the power chip; wherein the power chip comprises a first analyzing module and a working module; wherein an input terminal of the first analyzing module is connected to the timing controller, an output terminal of the first analyzing module is connected to the working module, and wherein the working module comprises a fault output terminal;

wherein the timing controller comprises a second analyzing module and a reset terminal, wherein an input terminal of the second analyzing module is connected to an output terminal of the memory, and the reset terminal is connected to the fault output terminal;

wherein during a power-on phase, the timing controller is configured to read and analyze driving data located in the memory through the second analyzing module, and transmit the analyzed driving data to the first analyzing module of the power chip for use by the power chip; and wherein during a fault phase, the fault output terminal of the working module is configured to output a fault signal, and the reset terminal is configured to receive the fault signal to control the timing controller and the power chip to reset in tandem;

wherein the working module comprises a register, a logic module, a delay control module, and a transistor; wherein an input terminal of the register is connected to the output terminal of the first analyzing module, an output terminal of the register is connected to an input terminal of the logic module, an output terminal of the logic module is connected to an input terminal of the delay control module, and an output terminal of the delay control module is connected to a gate of the transistor, wherein the power chip further comprises a first ground terminal connected to a drain of the transistor, and wherein the fault output terminal is connected to a source of the transistor;

wherein during the fault phase, the logic module is configured to output a high-level signal, which is operative to be delayed by the delay control module and then output to the gate of the transistor to control the transistor to be turned on, and the fault output terminal is operative to accordingly output a corresponding fault signal.

2. The driving circuit as recited in claim 1, wherein when the timing controller and the power chip are reset, the timing controller is configured to read and analyze the driving data located in the memory through the second analyzing module, and transmit the analyzed driving data to the first analyzing module of the power chip for use by the power chip.

3. The driving circuit as recited in claim 1, wherein the delay control module comprises an inverter, a delay controller, and a logical OR gate; wherein both an input terminal of the inverter and an input terminal of the delay controller are each connected to the output terminal of the logic module, both an output terminal of the inverter and an output terminal of the delay controller are each connected to an input terminal of the logical OR gate, and wherein an output terminal of the logic OR gate is connected to the gate of the transistor;

wherein during a normal display phase, the logic module is configured to output a low-level signal, and the inverter and the delay controller are operative to receive the low-level signal output by the logic module and output a low-level signal, wherein at this time the logic OR gate is operative to output a low-level signal;

wherein during the fault phase, the logic module is configured to output a high-level signal, the inverter and the delay controller are operative to receive the high-level signal output by the logic module, and the inverter is operative to output a high-level signal to the logic OR gate, the delay controller is operative to output a low level signal to the logic OR gate, and wherein at this time an output of the logic OR gate is a low-level signal; and wherein after a delay of N seconds, the delay controller is operative to output a high-level signal to the logic OR gate, wherein at this time the output of the logic OR gate is a high level signal operative to turn on the transistor;

wherein N is greater than 0.

4. The driving circuit as recited in claim 1, wherein the timing controller comprises a reset control module, wherein an input terminal of the reset control module is connected to the reset terminal;

wherein the reset terminal is operative to receive and send the fault signal to the reset control module, and the reset control module is operative to control the timing controller to reset.

5. The driving circuit as recited in claim 4, wherein when the power chip has a fault, the fault output terminal of the power chip is operative to output a low-level signal, and the reset terminal is operative to receive and send the low-level signal to the reset control module, and wherein the reset control module is operative to control the timing controller to reset;

wherein when the power chip is operating normally, the fault output terminal of the power chip is operative to output a high-level signal, and the reset terminal is operative to receive and send the high-level signal to the reset control module, and the reset control module does not perform reset.

6. The driving circuit as recited in claim 1, further comprising a power supply interface, a pull-up resistor, a storage capacitor, and a second ground terminal; wherein the power supply interface is connected to an input terminal of the pull-up resistor, wherein an output terminal of the pull-up resistor is connected to the reset terminal, to the fault output terminal and to an input terminal of the storage capacitor, wherein an output terminal of the storage capacitor is connected to the second ground terminal.

7. The driving circuit as recited in claim 1, wherein a connection between the memory and each of the timing controller and the power chip is an integrated circuit bus connection.

8. The driving circuit as recited in claim 7, wherein the timing controller is a communication master, and the power chip is a communication slave.

9. The driving circuit as recited in claim 7, wherein both the first analyzing module and the second analyzing module are integrated circuit bus control modules, and are each configured to receive data transmitted via an integrated circuit bus.

10. The driving circuit as recited in claim 1, wherein the memory is a charge-erasable programmable read-only memory.

11. The driving circuit as recited in claim 1, wherein the driving circuit comprises a printed circuit board, and wherein the memory, the timing controller and the power chip are all arranged on the printed circuit board.

12. The driving circuit as recited in claim 1, wherein the memory is configured to store first driving data and second driving data, wherein the first driving data is configured to drive the timing controller, and the second driving data is configured to drive the power chip.

13. The driving circuit as recited in claim 12, wherein the timing controller is configured to analyze the first driving data and the second driving data for use by the timing controller and the power chip.

14. A driving method applied to a driving circuit, wherein the driving circuit comprises a memory, a timing controller and a power chip; wherein the memory is connected to each of the timing controller and the power chip; wherein the power chip comprises a first analyzing module and a working module; wherein an input terminal of the first analyzing module connected to the timing controller, an output terminal of the first analyzing module is connected to the working module, and wherein the working module comprises a fault output terminal; wherein the timing controller comprises a second analyzing module and a reset terminal, wherein an input terminal of the second analyzing module is connected to an output terminal of the memory, and the reset terminal is connected to the fault output terminal; wherein during a power-on phase, the timing controller is configured to read and analyze driving data located in the memory through the second analyzing module, and transmit the analyzed driving data to the first analyzing module of the power chip for use by the power chip; wherein during a fault phase, the fault output terminal is configured to output a fault signal, and the reset terminal is configured to receive the fault signal to control the timing controller and the power chip to reset in tandem; wherein the working module comprises a register, a logic module, a delay control module, and a transistor; wherein an input terminal of the register is connected to the output terminal of the first analyzing module, an output terminal of the register is connected to an input terminal of the logic module, an output terminal of the logic module is connected to an input terminal of the delay control module, and an output terminal of the delay control module is connected to a gate of the transistor, wherein the power chip further comprises a first ground terminal connected to a drain of the transistor, and wherein the fault output terminal is connected to a source of the transistor; wherein during the fault phase, the logic module is configured to output a high-level signal, which is operative to be delayed by the delay control module and then output to the gate of the transistor to control the transistor to be turned on, and the fault output terminal is operative to accordingly output a corresponding fault signal; wherein the driving method comprises:

reading and analyzing, by the timing controller, the driving data located in the memory;

transmitting the analyzed driving data corresponding to the power chip to the first analyzing module of the power chip; and driving the power chip to operate according to the analyzed driving data.

15. The driving method as recited in claim 14, further comprising:

outputting, by the power chip, a fault signal;

receiving, by the timing controller, the fault signal;

resetting, by the timing controller and the power chip, in tandem;

reading and analyzing, by the timing controller, the driving data located in the memory;

transmitting the analyzed driving data corresponding to the power chip to the first analyzing module of the power chip; and driving the power chip to operate according to the analyzed driving data.

16. A display device, comprising a display panel and a driving circuit, the driving circuit being configured to drive the display panel;

wherein the driving circuit comprises a memory, a timing controller and a power chip; wherein the memory is connected to each of the timing controller and the power chip; wherein the power chip comprises a first analyzing module and a working module; wherein an input terminal of the first analyzing module is connected to the timing controller, an output terminal of the first analyzing module is connected to the working module, and wherein the working module comprises a fault output terminal;

wherein the timing controller comprises a second analyzing module and a reset terminal, wherein an input terminal of the second analyzing module is connected to an output terminal of the memory, and the reset terminal is connected to the fault output terminal;

wherein during a power-on phase, the timing controller is configured to read and analyze driving data located in the memory through the second analyzing module, and transmit the analyzed driving data to the first analyzing module of the power chip for use by the power chip; wherein during a fault phase, the fault output terminal is configured to output a fault signal, and the reset terminal is configured to receive the fault signal to control the timing controller and the power chip to reset in tandem;

wherein the working module comprises a register, a logic module, a delay control module, and a transistor; wherein an input terminal of the register is connected to an output terminal of the first analyzing module, an output terminal of the register is connected to an input terminal of the logic module, an output terminal of the logic module is connected to an input terminal of the delay control module, and an output terminal of the delay control module is connected to a gate of the transistor, wherein the power chip further comprises a first ground terminal connected to a drain of the transistor, and wherein the fault output terminal is connected to a source of the transistor;

wherein during the fault phase, the logic module is configured to output a high-level signal, which is operative to be delayed by the delay control module and then output to the gate of the transistor to control the transistor to be turned on, and the fault output terminal is operative to accordingly output a corresponding fault signal.

17. The display device as recited in claim 16, wherein the delay control module comprises an inverter, a delay controller and a logical OR gate; wherein both an input terminal of the inverter and an input terminal of the delay controller are each connected to an output terminal of the logic module, both an output terminal of the inverter and an output terminal of the delay controller are each connected to an input terminal of the logical OR gate, and wherein an output terminal of the logic OR gate is connected to the gate of the transistor;

wherein during a normal display phase, the logic module is configured to output a low-level signal, and the inverter and the delay controller are operative to receive the low-level signal output by the logic module and output a low-level signal, wherein at this time the logic OR gate is operative to output a low-level signal; wherein during the fault phase, the logic module is configured to output a high-level signal, the inverter and the delay controller are operative to receive the high-level signal output by the logic module, and wherein the inverter is operative to output a high-level signal to the logic OR gate, the delay controller is operative to output a low level signal to the logic OR gate, wherein at this time an output of the logic OR gate is a low-level signal; and wherein after a delay of N seconds, the delay controller is operative to output a high-level signal to the logic OR gate, wherein at this time the output of the logic OR gate is a high level signal to operative turn on the transistor;

wherein N is greater than 0.

18. The display device as recited in claim 16, wherein the timing controller comprises a reset control module, wherein an input terminal of the reset control module is connected to the reset terminal;

wherein the reset terminal is operative to receive and send the fault signal to the reset control module, and the reset control module is operative to control the timing controller to reset.

* * * * *